(12) United States Patent
Blange et al.

(10) Patent No.: US 8,144,717 B2
(45) Date of Patent: Mar. 27, 2012

(54) INITIALIZATION OF A WIRELESS COMMUNICATION NETWORK

(75) Inventors: Marinus Johannes Blange, Nootdorp (NL); Miodrag Djurica, Rotterdam (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 784 days.

(21) Appl. No.: 12/159,753

(22) PCT Filed: Jan. 2, 2007

(86) PCT No.: PCT/NL2007/000001
§ 371 (c)(1),
(2), (4) Date: Dec. 2, 2008

(87) PCT Pub. No.: WO2007/078193
PCT Pub. Date: Jul. 12, 2007

(65) Prior Publication Data
US 2009/0215482 A1 Aug. 27, 2009

(30) Foreign Application Priority Data
Dec. 30, 2005 (EP) .................................. 05078044

(51) Int. Cl.
*H04L 12/28* (2006.01)
(52) U.S. Cl. ............... 370/402; 370/395.2; 370/400; 370/401; 455/41.2; 455/445
(58) Field of Classification Search ............... 455/41.2, 455/435.1, 445; 370/338, 328, 329, 341, 370/395.2, 395.21, 400–402, 406
See application file for complete search history.

(56) References Cited

U.S. PATENT DOCUMENTS
7,548,523 B2 * 6/2009 Babbar et al. ............... 370/331
(Continued)

FOREIGN PATENT DOCUMENTS
EP 1 471 693 A2 10/2004

OTHER PUBLICATIONS
Forno et al., "Design and implementation of a Bluetooth ad hoc network for indoor positioning" IEE Proceedings: Software, IEE, vol. 152, No. 5, Oct. 7, 2005 pp. 223-228.
(Continued)

*Primary Examiner* — Dominic E Rego
(74) *Attorney, Agent, or Firm* — Leydig, Voit & Mayer Ltd.

(57) ABSTRACT

A wireless communication network comprises an association unit and a plurality of stations. At least part of the stations store association information indicative of an associated route for transmission of messages from the station to the association unit. The association information is generated by installing the stations in a not-associated state; transmitting association request messages from stations in the not-associated state; and transmitting association grant messages in response to the association request messages. Each association grant message is transmitted only from the association unit or, at least when the station that has transmitted association request message is outside a reception range of the association unit, from one of the stations that is in an associated state. Each station that has received the association grant message in response to its association request message is switched to the associated state. Association information is stored that indicates the station that has sent the association grant message as part of the associated route to the association unit.

20 Claims, 3 Drawing Sheets

U.S. PATENT DOCUMENTS

| | | | |
|---|---|---|---|
| 7,823,199 B1* | 10/2010 | Rathi et al. | 726/22 |
| 8,045,531 B2* | 10/2011 | Cheng et al. | 370/338 |
| 2001/0014868 A1* | 8/2001 | Herz et al. | 705/14 |
| 2003/0151513 A1 | 8/2003 | Herrmann et al. | |
| 2003/0174682 A1* | 9/2003 | Barker | 370/338 |
| 2004/0047307 A1* | 3/2004 | Yoon et al. | 370/324 |
| 2004/0223476 A1* | 11/2004 | Jose et al. | 370/338 |
| 2005/0088980 A1* | 4/2005 | Olkkonen et al. | 370/255 |
| 2005/0122927 A1 | 6/2005 | Wentink | |
| 2005/0195842 A1* | 9/2005 | Dowling | 370/401 |
| 2005/0221803 A1* | 10/2005 | Hayashi | 455/413 |
| 2006/0133266 A1* | 6/2006 | Kim et al. | 370/228 |
| 2006/0133328 A1* | 6/2006 | Levendel et al. | 370/338 |
| 2006/0166683 A1* | 7/2006 | Sharma et al. | 455/456.5 |
| 2006/0268756 A1* | 11/2006 | Wang et al. | 370/310 |
| 2007/0038346 A1* | 2/2007 | Ehrlich et al. | 701/33 |

OTHER PUBLICATIONS

Rubin et al., "TBONE: A Mobile-Backbone Protocol for Ad Hoc Wireless Networks" Aerospace Conference Proceedings, IEEE Mar 9-16, 2002. vol. 6, pp. 2727-2740.

International Search Report for PCT/NL/2007/0000001, dated Jun. 6, 2007.

\* cited by examiner

INITIALIZATION OF A WIRELESS COMMUNICATION NETWORK

FIELD OF THE INVENTION

The invention relates to a method of operating a wireless communication network, to a wireless communication system that uses such a method and to stations for use in such a network.

BACKGROUND

US patent application No. 2003/0151513 describes a wireless sensor station network. In operation data from the sensor stations is transmitted in multiple hops to a central panel and vice versa. This is because the sensor stations are not able to transmit directly to the central panel. Each sensor station is given its own, fixed route for transmitting and receiving data to and from the central panel. Typically, the data is first sent to another sensor station and from there to another sensor station and so on until a cluster head is reached. Then the data is sent through a network of cluster heads to the central panel.

After installation of the sensor stations at various locations in a sensing area a network topology is dynamically formed. That is, the routes for each of the sensor stations are automatically selected and programmed into the sensor stations. In US patent application No. 2003/0151513 describes a number of methods of dynamically forming the routes from the sensor stations to cluster head units that channel communication from groups of sensor stations. The initiative is taken by the cluster head unit, which transmits link discovery messages, which alert nearby sensor stations about the availability of the cluster head. These sensor stations forward the link discovery messages. Further sensor stations may receive and forward the forwarded link discovery messages and so on. The link discovery packets function to synchronize communication clocks of the cluster head and the sensor stations.

Next the routes for transmitting messages from the sensor stations to the association unit are defined. In one embodiment this is done by transmitting and forwarding route discovery packets from the association unit. The forwarded route discovery packets indicate the number of hops over which they have been forwarded. In this embodiment each sensor stations picks a route by selecting the association unit or sensor station from which it received a route discovery packet over least hops. The sensor stations record an indication of these routes for later use in normal operation. Subsequently, the sensor stations send route registration packets to the association unit to indicate the route that they have selected.

In another embodiment the sensor stations send link registration messages without waiting for route discovery messages. These link registration messages may reach the association unit via each available route. In this embodiment the association unit selects routes for the sensor stations from which it has received link registration messages. After making the selection the association unit sends route definition messages to the sensor stations for recording an indication of these routes for later use in normal operation.

A problem with these techniques is that they require transmission of information via sensor stations before the routing topology has been defined, i.e. when plural routes are still possible. This complicates the (sensor) stations, because they have to support different modes of communication while operating in low-power mode. If forwarding of information is only done using the definite routing topology, a central approach is slow (each station has to wait until its upward station has centrally been assigned a route) and a decentral approach is inefficient (a routing topology with an unnecessary amount of branches has been created)

Another problem that may occur is that the wireless links between nodes are hindered by barriers and that using the same frequency for upward and downward link routes requires synchronization. This complicates the (sensor) station, because they have to support synchronization and powerful RF signals.

A mobile communications protocol is known from an article titled "TBONE: A Mobile-Backbone Protocol for Ad Hoc Wireless Networks" by Izhak Rubin et al. and published in the IEEE Aerospace Conference proceedings 2002 (Piscataway N.J., Mar. 9-16, 2002) page 2727-2740. The mobile protocol of this article uses two types of network: a high power network termed the BNET, or backbone, and a plurality of low power networks called ANETs. In each low power network (ANET) low power nodes communicate under control of a central node of that ANET. Each of the central nodes also functions as backbone node, i.e. as a node in the high power backbone network.

Devices are provided that are capable of operating as backbone nodes. Initially, each of these devices decides whether it will switch to operation as backbone node, dependent on whether it has a higher qualifications to do so than neighboring devices that are capable of operating as backbone nodes. Subsequently, those devices that have switched to operation as backbone nodes receive join requests from remaining nodes that want to become part of a low power network (ANET) centred on a particular backbone node. The low power networks (ANETs) are formed by granting these join requests. Join requests can come from both remaining backbone capable devices that have not decided to operate as backbone devices, and from low power nodes that are not capable of operating as backbone devices at all.

The article also describes the possibility that remaining backbone capable devices (that have not initially decided to operate as backbone devices) can be commanded to become backbone nodes by existing backbone nodes. This happens when a remaining backbone capable device that is part of a low power network (ANET) receives and relays a join request from a requesting node that cannot be accepted by any existing backbone node. When this happens the central backbone node of the low power network (ANET) commands the remaining backbone capable device to switch to operation as a backbone node and to grant the join request of the requesting node. In this case the remaining backbone capable device joins the high power network (BNET), sets up a low power network (ANET) of its own and ceases to use the paths in the low power network (ANET) of the commanding backbone node. The remaining backbone capable device uses the high power network to relay further messages to or from the requesting node. No provision is made for routing through successive previously established low power network (ANET) nodes and association for this form of routing.

This system addresses the use of two types of network links: links in the low power networks and links in the high power networks. Direct communication links (not via other associated nodes) are used in the low power networks. The selection of communication paths in the high power network is not described, but as high power communication is used longer range paths can be used in this network than in the low power networks. As the system is intended to provide communication in a dynamic environment rather than control of devices in the system there is no single central backbone node. The use of two types of network without central unit makes this system complex and inefficient in bandwidth use.

SUMMARY OF THE INVENTION

Among others, it is desirable to provide for a wireless network wherein routes for communication can be determined without the need to forward information via stations for which the routes have not yet been defined.

Among others, it is desirable to provide for a method of operating a wireless network wherein routes for communication can be determined without the need to forward information via stations for which routes have not yet been defined.

Among others it is desirable to provide for stations for flexible use in wireless networks.

The invention provides for a wireless communication network according to claim 1. This network allows routes between stations and an association station to be set up for further use, using routes that have already been defined in response to earlier associations. Each route is established when an association request from a station is granted. Establishment of a route is effected by the association unit for example by storing information that defines the route to the associated station in a memory that the association unit uses to select the route each time when a message has to be sent to the associated station. Routes are established upon an association grant from the association unit or from a station that has switched to the associated state directly or indirectly based on an association grant from the association unit, in a wave of association that radiates from nodes to nodes starting from the association unit. Only the association unit and stations that have an established route to the association unit, which has been established in this way in response to association requests and corresponding association grants by nodes along the route, are allowed to grant association requests. Therefore their routes can immediately be used for the station that is associated.

In an embodiment a station is configured to transmit association requests first for association via an active frequency channel and subsequently, if the first transmitted association request is not granted, for association via an as yet unused frequency channel. The latter request may be transmitted for example directly to the association unit. Because the route that is to be used to the station is established only upon association it is prevented that inconsistent multiple routes are assigned when such different association requests are transmitted.

More generally, in an embodiment the station that issues the association grant to a specific station is configured to make issue of the association grant dependent on whether the specific station indicates that a function that is active in that specific station or not. This means that a specific station may associate with different other stations, dependent on whether the function is active in the specific station or not. As a result the specific station has the opportunity to issue a plurality of association requests: without activating the function and after the function is activated, for example with a request directly to the association unit. Thus, for example, if the function consumes a scarce resource (such as function that uses a frequency channel for communication between the stations, thereby excluding use of the frequency channel by other stations), it can be prevented that the resource is consumed needlessly by granting the association request before activating the function. Because the routes to stations are established only upon association it is prevented that inconsistent station addresses are assigned.

In an embodiment association is preceded by a discovery stage, wherein no routes are yet established but station discover other stations, that can function to relay messages. Thus, stations may be enabled first to discover addresses of available other stations to which association requests can be sent, or stations that may send association requests before a route is established. In a further embodiment discovery advertisement messages are used that identify stations that are enabled to grant discovery requests. Thus, it is made possible to avoid waste of energy or bandwidth on association requests that cannot be granted.

In another embodiment part of the stations are dual function stations, which start to send association grant messages only after receiving approval from the association unit to do so. Thus, the association unit has control over the selection of stations that act as relay station, even after the dual function station has obtained a route for its "own" messages (e.g. sensor messages from a built in sensor station). In an embodiment the dual function station comprises units that function as a beacon frame transmitter and as a station with sensor station-like communication abilities respectively. The association unit may follow a strategy of enabling such dual function stations selectively to avoid enabling many stations that act as relay for only a few stations each, or to avoid selecting stations when these will become a relay for messages for too many stations.

In another embodiment dual function stations are used that comprises a mechanically flexible connection between separate units that each have an antenna or antennas for transmission and reception. Thus such stations can be used to connect different spaces "around the corner".

In another embodiment dual function stations are used that operate concurrently in different frequency channels that are periodically active in time slots that repeat with different asynchronous periods. This simplifies coordination between different network parts.

BRIEF DESCRIPTION OF THE DRAWINGS

These and other objects and advantageous aspects will be described for exemplary examples, using the following figures.

DETAILED DESCRIPTION OF THE DRAWINGS

Figure 1:
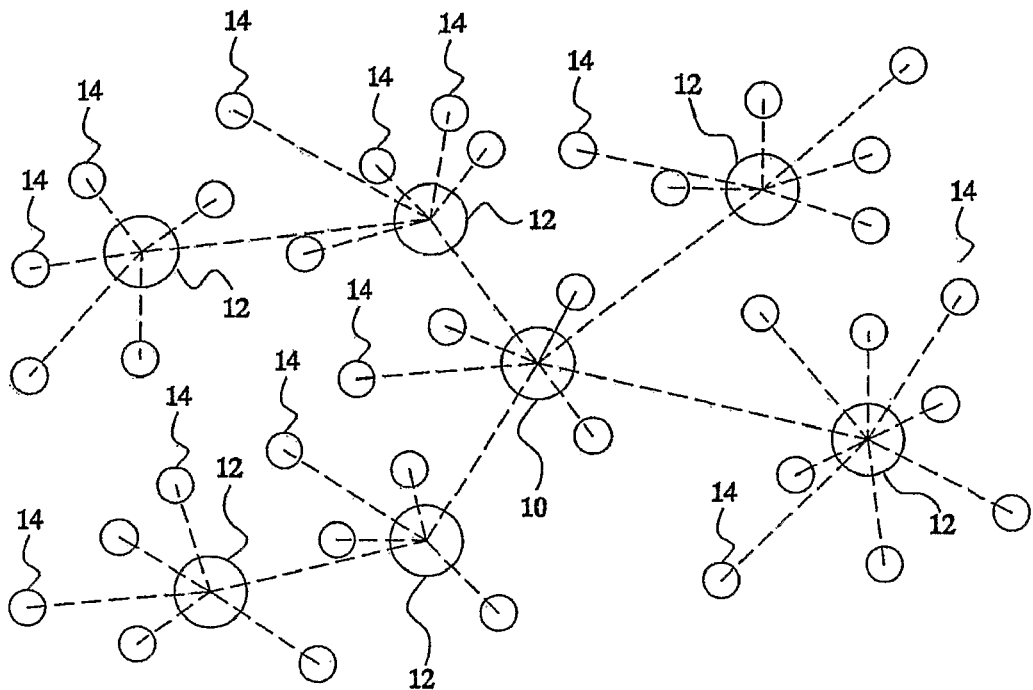
FIG. 1 shows a wireless network

FIG. 1 shows a wireless network. The network comprises an association unit 10, a plurality of beacon frame transmitters 12 and a plurality of sensor stations 14 (only some numbered explicitly). Fixed communication routes are defined between association unit 10 and sensor stations 14, using wireless communication links (shown by dashed lines) between association unit 10, beacon frame transmitters 12 and sensor stations 14. The communication routes form a tree structure with association unit 10 at its root and beacon frame transmitters 12 at its nodes. Each beacon frame transmitter 12 is coupled in a star topology to a number of the sensor stations 14.

Figure 2:
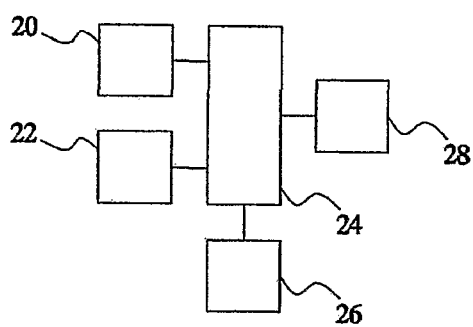
FIG. 2 shows a station

FIG. 2 shows a station. At the level of detail shown, the figure applies to beacon frame transmitters 12 as well as sensor stations 14. The station contains a receiver circuit 20, a transmitter circuit 22, a processor circuit 24, a memory 26 and, at least in case of sensor stations, a sensing circuit 28. Processor circuit 24 is coupled to receiver circuit 20, transmitter circuit 22, memory 26 and optionally to sensing circuit 28. Each of receiver circuit 20 and transmitter circuit 22 include an antenna (not shown). Preferably, the antennas of receiver circuit 20 and transmitter circuit 22 are formed by a shared antenna of receiver circuit 20 and transmitter circuit 22.

Preferably the stations are battery operated, with on board batteries (not shown) or supplied by other on board power supplies such as solar cells. This means that it is desirable to reduce power consumption as much as possible.

In operation, data is exchanged between sensor stations 14 and association unit 10 via the links that are shown in FIG. 1. Because the links form a tree structure, a single route to and from association unit 10 is defined for each sensor station 12.

It should be appreciated that the communication routes are a result of selection from a greater number of possible routes. In principle, each sensor station 14 could communicate directly with association unit 10 and each beacon frame transmitter 12. In practice, a number of these direct communication routes are not possible, because of insufficient signal strength. But direct wireless communication from a sensor station 14 to still more than one beacon frame transmitters 12 and/or to association unit 10 may be possible. Similarly, each beacon frame transmitter 12 may be able to communicate directly with association unit 10 and/or a number of beacon frame transmitters 12.

The wireless connections shown in FIG. 1 are the result of a selection from these possible routes. A number of operable wireless communication links between sensor stations 14, beacon frame transmitters 12 and association unit 10 is not used. These links are not shown in FIG. 1. Sensor stations 14 transmit messages to association unit 10 via fixed routes and conversely association unit 10 transmits messages to sensor stations via the fixed routes. The routes are defined by information in memory 26.

Each sensor station 14 stores at least information that is selective for the beacon frame transmitter 12 at the start of its route to association unit 10; this address information is used to form messages that the sensor station 14 sends to association unit 10. Typically, each beacon frame transmitter 12 stores at least information that is selective for the next beacon frame transmitter 12 in the route or for association unit 10. This information is used to forward messages from the sensor station 14 sends to association unit 10. Alternatively, each sensor station 14 may store information that is selective for the entire route to association unit 10 and the sensor station 14 may use this information to form messages, from which beacon frame transmitters 12 can determine how to forward the message.

Conversely, association unit 10 preferably stores information for each sensor station 14 that is selective for the beacon frame transmitter 12 at the start of the route to that sensor station 14. Association unit 10 uses this information to form messages that association unit 10 transmits to the sensor station 14. Typically, association unit 10 stores information that identifies the entire route to each sensor station 14. The association unit 10 may use this information to form messages, from which beacon frame transmitters 12 can determine how to forward the message to the sensor station 14. Alternatively, each beacon frame transmitter 12 stores, for each sensor station 14 for which it can receive messages, at least information that is selective for the next beacon frame transmitter 12 in the route to that sensor station 14. This information is used to forward messages for the sensor station 14 from association unit 10 to the sensor station 14.

An embodiment of the part of operation wherein the routes are established will now be described. Basically this embodiment includes two stages:

a discovery stage wherein beacon frame transmitters 12 and sensor stations 14 become "aware" of stations (association unit 10 or beacon frame transmitters 12 in the case of sensor stations and association unit 10, other beacon frame transmitters 12 and sensor stations 14 in the case of beacon frame transmitters 14) that are within reception range and an association stage wherein sensor stations 14 and beacon frame transmitters 14 (or sensor stations that are fixedly coupled to these beacon frame transmitters) send requests to associate to association unit 10 or beacon frame transmitters 12, i.e. to establish a route through the association unit 10 or beacon frame transmitter 12 for subsequent use.

The association stage for a sensor station 14 (or beacon frame transmitter 12) is completed when an association request is granted by the association unit 10 or a beacon frame transmitter 12. The route via the granting station is thereby established for subsequent use. In one embodiment each beacon frame transmitter 12 is enabled to grant association requests immediately after it has received a grant of an association request itself, but preferably the beacon frame transmitter 12 is enabled to grant association requests only after receiving secondary grant message, this time from the association unit 14 that allows the beacon frame transmitter 12 to grant association requests. Association unit 10 may for example make issuance of the secondary grant message dependent on information about the number of as yet unassociated stations that the beacon frame transmitter 12 has discovered. Thus, association unit 10 can control network topology.

Preferably, the association requests are addressed specifically to beacon frame transmitters 12 or the association unit 10, using addresses (or more generally any identifier of these stations) that have been discovered in the discovery stage. Thus, it is excluded that conflicting association grants can be received in response to an association requests. However, addressing may be made unnecessary, for example when stations address all subsequent messages to one station that has sent a grant, or if some conflict resolution scheme is used.

In the embodiment the discovery stage comprises use of discovery messages from sensor stations 14 and beacon frame transmitters 12 (or sensor stations that are fixedly coupled to these beacon frame transmitters 12) and responses in reaction to these discovery messages. Alternatively or in addition, stations may be discovered from unsolicited messages. The discovery stage and the association stage may overlap, the stations continuing to collect identifiers of discovered stations between transmission of association requests during the association stage. Alternatively non-overlapping consecutive stages may be used. In another embodiment the discovery stage may even be eliminated, for example if association requests are used that are not specifically addressed, or if association requests are used to discover stations.

When the discovery stage and the association stage may overlap, it is preferred that beacon frame transmitters 12 include information in their messages to indicate whether they have been enabled to grant association requests (preferably in general, i.e. not limited to requests from specific sensor stations 14, but in a further embodiment specific sensor stations 14 or beacon frame transmitters 12 from which association requests may be accepted may be indicated).

Thus, sensor stations 14 and/or beacon frame transmitters 12 can avoid transmission of association requests to discovered beacon frame transmitters 12 that are not enabled to grant association requests.

Figure 3:
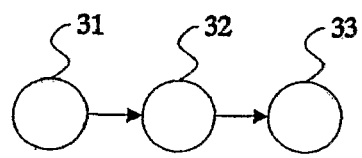
FIG. 3 shows a state diagram of a sensor station
Figure 5A:
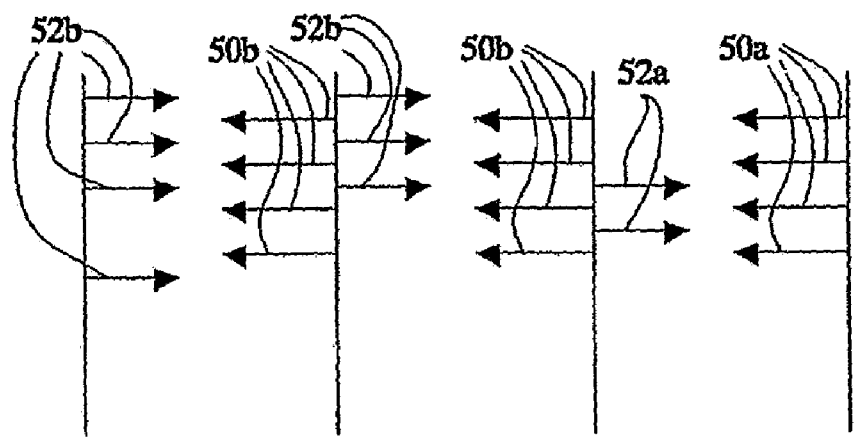
FIG. 5a shows messages during a discovery phase
Figure 5B:
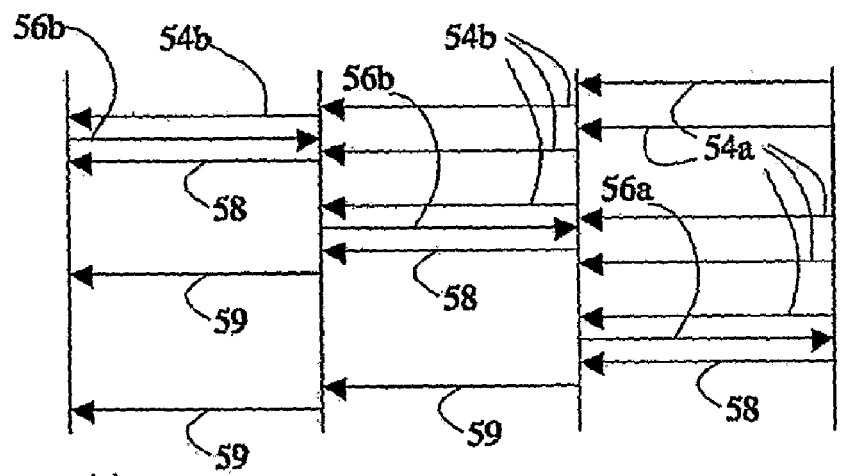
FIG. 5b shows messages during an association phase

FIG. 3 shows a state diagram of operation of a sensor station 14 before a route is established. FIGS. 5a,b shows messages exchanged with sensor station 14 during discovery and association respectively. Initially the sensor station 14 is in a first state 31. In this first state 31 processor circuit 24 causes transmitter 22 to transmit discovery messages 50a, for example once every minute, every two minutes or every hour. When processor circuit 24 detects that receiver 20 has received a beacon frame 52a from a beacon frame transmitter 12 or association unit 10, processor circuit 24 switches sensor station 14 to a second state 32. In this way, the beacon frame 52a acts as a discovery confirm message.

Preferably, sensor station 14 switches to second state 32 in response indiscriminately to both beacon frames 52a that are transmitted in response to the discovery message or to any other beacon frame that is received spontaneously. In an embodiment sensor station 14 switches to second state 32 in response only to beacon frames 52a wherein it is indicated that the transmitting station is prepared to grant association requests and not to optional other beacon frames 52a that do not contain such an indication.

In second state 32 processor circuit 24 causes transmitter 22 to transmit association request messages 54a for example once every minute, every two minutes or every hour. Preferably each association request message 54a includes an identification of the sensor station 14 that allows messages specifically directed at the sensor station 14 to be sent in response. Also preferably, processor 24 reads an identification of the beacon frame transmitter 12 or association unit 10 from a previously received discovery confirm message and includes that identification in the association request message. This may be done for example when it is desirable to avoid collisions between association grant messages in response to the association request message.

When processor circuit 24 detects that receiver 20 has received an association grant message 56a from a beacon frame transmitter 12 or association unit 10 directed at the sensor station 14 of the processor circuit 24 in response to an association request message 54a, processor circuit 24 switches sensor station 14 to a third state 33 and records information for reaching this beacon frame transmitter 12 or the association unit 10 in memory 26 to define route to association unit 10 for use during normal operation. Optionally sensor station sends an acknowledgment 58 of the association grant message back to the beacon frame transmitter 12 or association unit 10.

In third state 33 sensor station 14 stops transmitting association request messages 54a. In one embodiment sensor station 14 stops transmitting discovery messages 50a already when it switches to second state 32. Alternatively sensor station 14 may be arranged to continue transmitting discovery messages 50a in second state 32, only to stop after switching to third state 33 or after a predetermined time interval has elapsed after switching to second state 32, if this occurs earlier than the switch to third state 33.

In an embodiment a station is configured to transmit association requests first for association via an active frequency channel and subsequently, if the first transmitted association request is not granted, for association via an as yet unused frequency channel. The latter request may be transmitted for example directly to the association unit. Because the route that is to be used to the station is established only upon association it is prevented that inconsistent multiple routes are assigned when such different association requests are transmitted.

More generally, in an embodiment the station that issues the association grant to a specific station is configured to make issue of the association grant dependent on whether the specific station indicates that a function that is active in that specific station or not. This means that a specific station may associate with different other stations, dependent on whether the function is active in the specific station or not. As a result the specific station has the opportunity to issue a plurality of association requests: without activating the function and after the function is activated, for example with a request directly to the association unit. Thus, for example, if the function consumes a scarce resource (such as function that uses a frequency channel for communication between the stations, thereby excluding use of the frequency channel by other stations), it can be prevented that the resource is consumed needlessly by granting the association request before activating the function. Because the routes to stations are established only upon association it is prevented that inconsistent station addresses are assigned.

Figure 4:
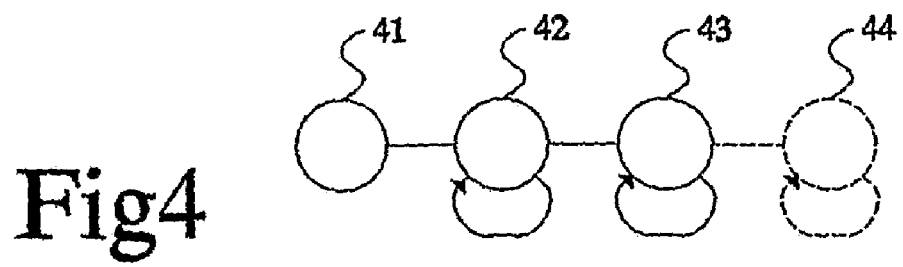
FIG. 4 shows a state diagram of a beacon frame transmitter

FIG. 4 shows a state diagram of operation of a beacon frame transmitter 12 before a route is established. Initially the beacon frame transmitter 12 is in a first state 41. In this first state 41 processor circuit 24 causes transmitter 22 to transmit discovery messages 50b, for example once every minute, every two minutes or every hour. When processor circuit 24 detects that receiver 20 has received a beacon frame 52b from another beacon frame transmitter 12 or association unit 10, processor circuit 24 switches beacon frame transmitter 12 to a second state 42. In this way, the beacon frame 52b acts as a discovery confirm message. In an embodiment discovery confirm messages may also be transmitted unsolicited, i.e. not in response to a discovery message, in this sense discovery messages could also be called "hello" messages. The term "discovery advertisement message" is used herein both for messages in response to discovery requests and unsolicited (hello) messages. Examples of use of discovery advertisement messages will be given in terms of discovery confirm messages, but unless indicated otherwise these examples apply generally for discovery advertisement messages. In a further embodiment stations need not transmit discovery messages 50a,b at all. In this case the stations listen only to unsolicited messages. The discovery confirm message does not need to be addressed to any station in particular: any station may react to any discovery confirm message.

Preferably, beacon frame transmitter 12 switches to second state 42 in response indiscriminately to both a beacon frame 52b that is transmitted in response to the discovery message or to any other beacon frame that is received spontaneously. In an embodiment sensor station 14 switches to second state 42 in response only to beacon frames 52b wherein it is indicated that the transmitting station is prepared to grant association requests and not to optional other beacon frames 52b that do not contain such an indication.

In second state 42 processor circuit 24 causes transmitter 22 to transmit association request messages 54b, for example once every minute, every two minutes or every hour. Preferably each association request message 54b includes an identification of the beacon frame transmitter 12 that allows messages specifically directed at the beacon frame transmitter to be sent in response. Also preferably, processor 24 reads an identification of the beacon frame transmitter 12 or association unit 10 from a previously received discovery confirm message and includes that identification in the association request message. This may be done for example when it is desirable to avoid collisions between association grant messages in response to the association request message.

When processor circuit 24 detects that receiver 20 has received an association grant message 56*b* from another beacon frame transmitter 12 or association unit 10 in response to an association request message 54*b*, processor circuit 24 switches beacon frame transmitter 12 to a third state 43 and records information for reaching this other beacon frame transmitter 12 or the association unit 10 in memory 26 to define a route to association unit 10 for use during normal operation. Optionally frame transmitter 12 sends an acknowledgement 59 of the association grant message back to the beacon frame transmitter 12 or association unit 10.

In third state 43 frame transmitter 12 stops transmitting association request messages 54*b*. In one embodiment frame transmitter 12 stops transmitting discovery messages 50*b* when it switches to second state 42. Alternatively frame transmitter 12 may stop after switching to third state 43, or after a predetermined time interval has elapsed after switching to second state 42, if this occurs earlier than the switch to third state 42.

Preferably beacon frame transmitter 12 transmits discovery confirm messages in at least when in second and third state 42, 43. More preferably beacon frame transmitter 12 includes an indication in the discovery confirm messages indicating whether the beacon frame transmitter 12 is ready to respond to association grant messages with association requests. This allows stations to avoid using bandwidth for transmission of useless association requests. In principle beacon frame transmitter 12 may also be arranged to transmit discovery confirm messages in the first state 41. Preferably, when beacon frame transmitter 12 receives a discovery request message from a sensor station 14 or another beacon frame transmitter 12 beacon frame transmitter 12 records an identification of the sensor station 14 or other beacon frame transmitter 12 from which the discovery request was received. Optionally beacon frame transmitter 12 also records identifications of stations that have transmitted association requests that the beacon frame transmitter 12 did not respond to, if any.

In first state 41 and second state 42 beacon frame transmitter 12 does not respond to association request messages 54*a*. However, in third state 43 beacon frame transmitter 12 does respond to association request messages 54*a*. In this state processor circuit 24 causes transmitter 22 to transmit an association grant message 56*a* in response to each received association request message 54*a*, directed at the station that has sent association request message 54*a*, using the station identification in the association request message 54*a*. Processor circuit 24 includes information for reaching the beacon frame transmitter 12 in the association grant message 56*a* and optionally also further information for reaching association unit 10.

Furthermore, beacon frame transmitter 12 transmits an update message 59 with information that the sensor station 14 has been associated to association unit 10 after sending the association grant message 56*a* (and after receiving an optional acknowledgment 58 of that message).

This response of beacon frame transmitter 12 to association request messages 54*a* is not limited to such messages from sensor stations 14, but applies also to association request messages 54*b* from other beacon frame transmitters 12.

It should be noted that beacon frame transmitter 12 and sensor station 14 become stations of the network with well defined routes only when reaching their respective third states 33, 43. Furthermore it should be noted that beacon frame transmitters 12 respond to association request messages 54*a,b* only once they have entered their third state 43, that is, only when the beacon frame transmitter 12 has a well defined route to association unit 10. Thus, the information about association can be transmitted along the route that will be used during normal operation. This route may also be used as part of the route to the newly associated sensor station 14. Association unit 10 may use information from its memory, about the route to the beacon frame transmitter 12 to define the route to the sensor station 14. In another embodiment, the beacon frame transmitters 12 along the route may add their identity to inform association unit 10 of the route, or in yet another embodiment the beacon frame transmitter 12 that associates to the sensor station 14 may insert this information.

It may be noted that not all beacon frame transmitters 12 need to become part of the network as beacon frame transmitters. If a beacon frame transmitter 12 receives no association grant signal 56*b* or grants no association grant requests from other beacon frame transmitters 12 or sensor stations 14 the beacon frame transmitter 12 does not become a functional beacon frame transmitter in the network.

In an embodiment association unit 10 decides on whether a beacon frame transmitter 12 becomes a functional beacon frame transmitter. In this embodiment functional beacon frame transmitters 12 in third state 43 forward association requests 54*a* from other beacon frame transmitters 12 (and optionally also from sensor stations 14) to association unit 10 before sending an association grant message 56*b*. (Alternatively a further message derived from this association request is forwarded).

In this embodiment association unit 10 is arranged to grant or deny the forwarded association request in response to forwarding (or to the further message). When the association request is granted association unit sends back a grant message, which is used to generate the association grant signal 56*b* to the original association request 54*b*. Thus association unit 10 (and/or a beacon frame transmitter 12) is enabled to control generation of the network topology, for example by first granting association to selected preferred beacon frame transmitters and granting association requests to others later only if this is still necessary to complete connections to all sensor stations 14.

In a further embodiment beacon frame transmitters 12 are arranged to supply information about the number and/or identity of the sensor stations 14 and or beacon frame transmitters 12 from which it has received beacon frame request messages and/or association request messages. The identity may be provided by including identity information in beacon frame request messages and/or association request messages. The beacon frame transmitters 12 may supply this information for example in their own beacon frame request messages and/or association request messages. In this further embodiment the association unit 10 (and/or a beacon frame transmitter) is provided with information which it may use to select beacon frame transmitters 12 for granting association. This may be used for example to distribute links over several beacon frame transmitters 12, or on the contrary to avoid distribution by concentrating links on one beacon frame transmitter 12.

In a further embodiment beacon frame transmitters 12 return grants of in response to association requests only after receiving a grant of a secondary association request, distinguished, at least in function, if not in format, from the previously described association request. For this purpose optionally an additional fourth state 44 may be added to the states of FIG. 4. When in third state 43 (after receiving the previously described grant to one of the previously described association requests, which will be termed primary association requests beacon frame transmitter 12 transmits a secondary association request to association unit 10. Upon receiving a grant of this secondary association request beacon frame transmitter 12 switches to the fourth state 44. In this embodiment the beacon frame transmitter 12 is enabled to begin to return association grant messages to requesting stations only in fourth state 44. Optionally the beacon frame transmitter indicates this in discovery confirm messages.

Preferably beacon frame transmitter 12 is configured to include a list of stations from which beacon frame transmitter 12 has received discovery request messages (and/or not-granted association request) in the secondary association request. As an alternative beacon frame transmitter 12 may optionally be configured to transmit one or more accompanying messages to provide such a list to association unit 10. This enables association unit 10 to select to which of the beacon frame transmitters 12 it will grant association requests of the second type. In this way association unit 10 can control the network topology, after admitting beacon frame transmitters 12 to the network by granting a primary association request.

In a preferred embodiment each functional beacon frame transmitter 12 (and association unit 10, which acts as a beacon frame transmitter in this respect) operates in a time slot scheme during normal operation, periodically transmitting a beacon signal to which the sensor stations 14 that are associated with that beacon frame transmitter may synchronize. After the beacon signal the beacon frame transmitter 12 and its associated stations exchange messages for a limited period.

This allows the beacon frame transmitters 12 and the sensor stations 14 to switch between a low power sleep mode and a normal operating mode. After exchanging messages the beacon frame transmitters 12 and the sensor stations 14 switch to the sleep mode wherein power supply and/or clock signals to at least part of the beacon frame transmitter 12 and the sensor station 14 is switched off. After counting off a predetermined time-interval the beacon frame transmitters 12 and the sensor stations 14 switch back to the normal operating mode. With a predetermined delay after switching to the normal operating mode the beacon frame transmitter 12 transmits the beacon frame and the sensor stations 14 receive this beacon frame.

In this embodiment the association unit 10 and/or the beacon frame transmitters preferably select the timing of the first of the periodic beacon frames so that the time slots of different beacon frame transmitters 12 that are within range to receive each others messages do not overlap. In this embodiment the information in the sensor stations 14 after association defines the time slot in which the sensor station 14 should switch to the normal operating mode.

In one embodiment each beacon frame transmitter 12 also switches to a forwarding mode in the time slot defined by the further beacon frame transmitter 12 through which the original beacon frame transmitter 12 transmits messages to the association unit 10 (or in the time slot of the association unit 10). When in the forwarding mode the original beacon frame transmitter 12 exchanges messages with the further beacon frame transmitter 12.

This embodiment has the disadvantage that overlap of the time slots of neighboring beacon frame transmitters 12 must be avoided. This means that beacon frame transmitters 12 must monitor time slots of other beacon frame transmitter 12. In turn this means that the beacon frame transmitters 12 cannot operate in the sleep mode as much as desirable.

In an alternative embodiment the beacon frame transmitter 12 are designed to transmit and receive in a selectable one of a plurality of frequency channels. In this embodiment the frequency channels for different functional beacon frame transmitters 12 are selected during initialization, for example by the beacon frame transmitters themselves after detecting that no messages are received in the frequency channel during a predetermined time period, or by the association unit 10 so that beacon frame transmitters 12 that have been detected to receive each other get different frequency channels to avoid collisions. In an embodiment the beacon frame transmitters 12 and their associated sensor stations 14 switch to the selected frequency channel when they start normal operation. In this embodiment the information in the sensor stations 14 after association defines the frequency channel for communicating with the beacon frame transmitter 12. Use of different frequency channels has the advantage that no extensive synchronization between time slots of beacon frame transmitters 12 is needed. Therefore beacon frame transmitters 12 can switch to the sleep mode more often.

In this further embodiment one frequency channel may be used during initialization. Alternatively a plurality of the frequency channels may be used in parallel. As an alternative the beacon frame transmitters 12 themselves may select a frequency channel during initialization after detecting that no messages are received in the frequency channel during a predetermined time period. Subsequently each beacon frame transmitter 12 performs all of its operations towards sensor stations 14 using the selected frequency channel, and uses another frequency channel to make upstream connections toward association unit 10.

Figure 6:
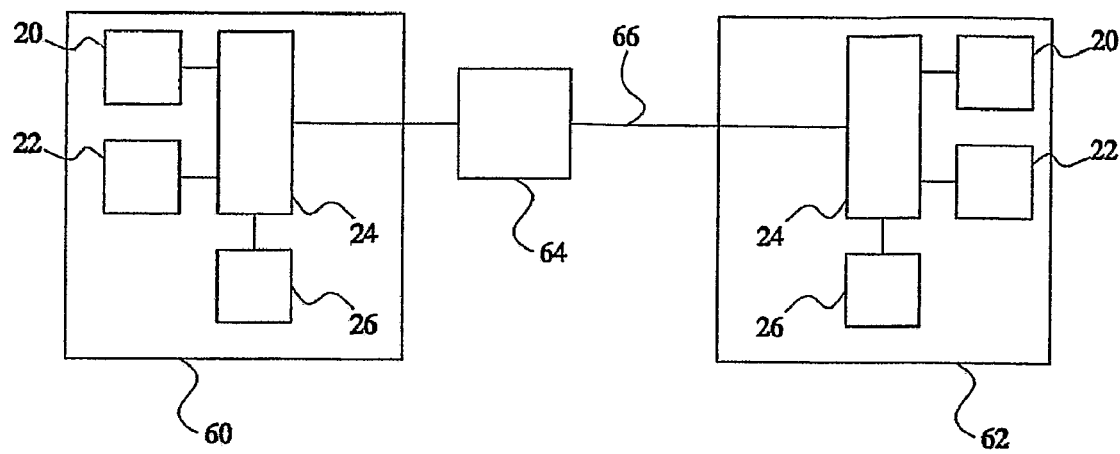
FIG. 6 shows an embodiment of a beacon frame transmitter

FIG. 6 shows a further embodiment of a beacon frame transmitter. The beacon frame transmitter contains two unit 60, 62 as shown in FIG. 2, plus a message exchange memory 64 coupled between the processor circuits 24 of the two units. In one embodiment mutually different units 60, 62 are used, a first unit 60 arranged to perform the functions of a beacon frame transmitter (having a higher power transmitter 22 and/or a differently programmed processor circuit for example than the other unit) and a second unit 62 of a type used in sensor stations 14. A mechanically flexible connection 66 is provided between the units 60, 62 (e.g. between message exchange memory 64, which may be part of the first unit 60 and second unit 62). Flexible connection 66 is for example at least 5 centimetre long.

In this embodiment a first unit 60 acts as beacon frame transmitter, except for the transmission of discovery requests 50*b*, association requests 54*b* and any communication towards association unit (e.g. update message 59). The second unit 62 performs the remaining functions of the beacon frame transmitter. It may be noted that this second unit performs much like a sensor station 14, except that it does not generate or receive its own messages. Instead it forwards messages to or from the other unit. Messages to and from the association unit 10 or other beacon frame transmitters 12 (or data from such messages) are placed in message exchange memory 64.

In normal operation units 60, 62 switch between the sleep mode and normal active mode in time slots defined by respective beacon frames. The unit that acts as beacon frame transmitter transmits its own beacon signal, preferably in the select frequency channel for the beacon frame transmitter. The unit that acts as sensor station switches to the normal operation mode in the time slot defined by the beacon frames of the further beacon frame transmitter to which the beacon frame transmitter 60, 62, 64 is associated. Thus, no power expensive synchronization is needed.

Figure 7:
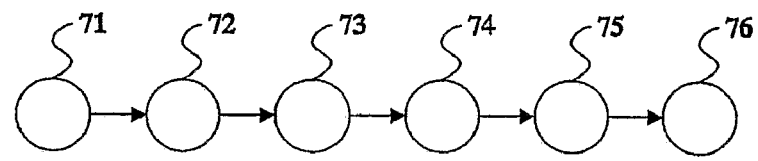
FIG. 7 shows a state diagram of a beacon frame transmitter

FIG. 7 shows a state diagram of operation of the paired units of FIG. 6 during discovery and association. The paired units 60, 62 start in a first state 71 wherein a second unit 62 of the pair 60, 62 that acts like a sensor station transmits discovery messages. When the second unit 62 detects that a beacon frame from a beacon frame transmitter 12 or association unit 10 has been received, the paired units switch to second state 72. In second state 72 the first unit 60 of the pair that acts as a beacon frame transmitter starts transmitting beacon frames in response to received discovery messages by transmitting a discovery confirm message. In these beacon frames the first unit 60 includes information to indicate that the first unit 60 is not yet associated.

Also in second state 72 the second unit 62 starts monitoring whether it receives beacon frames with information that indicates that the station that transmits the beacon frame has been associated (or is association unit).

When the second unit 62 detects a beacon frame with information that indicates that the unit that transmits the beacon frame has been associated, the paired units 60, 62 switch from second state 72 to a third state 73. Herein the second unit 62 starts transmitting association requests. When the second unit 62 receives an association confirmation in response, the paired units 60, 62 switch to a fourth state 74. In second, third and fourth state 72, 73 and 74 first unit 60 starts and restarts counting a time out interval. The time out interval is restarted each time when first unit 60 receives a discovery message from a new source (sensor station or other beacon frame transmitter). The time out interval expires after a predetermined duration (e.g. a minute or more) wherein first unit 60 has received no discovery message from any new source. After expiration of the time out interval unit 60 stops transmitting beacon frames in response to received discovery messages.

From fourth state 74, after expiry of the time out interval the paired units 60, 62 switch to a fifth state 75 wherein second unit 60 transmits a beacon frame transmitter association request for the first unit 62, listing the sources from which the first unit has received a discovery message. This beacon frame transmitter association request is forwarded to association unit 10, which grants or denies the request, dependent on the list (granting the request for example if more than a threshold number of sources are listed that have not yet been associated). When the beacon frame transmitter association request is denied, new beacon frame transmitter association requests may be sent. Association unit 10 may be configured to lower the threshold with time so that the same request may be granted later if a source that is mentioned in the request cannot be reached in any other way even after an extended period of time.

Association unit 10 sends a grant message with a grant signal to the first unit 60 via the second unit 62. When the grant message is received the paired units 60, 62 switch to a sixth state 76. Wherein first unit 62 starts transmitting beacon frames indicating that it has been associated, after which it can cause other units to switch from the first state 72 to the third state 73.

Although completely separate units 60, 62 are shown, it should be appreciated that part or all of these units may use shared circuits. Use of separate circuits has the advantage that a standard sensor station unit may be used. The use of a flexible connection has the advantage that the different units may be located "around a corner" from each other, so that one unit has contact with a space to which the other has no contact. Thus, a system in a building can be realized very easily with this type of beacon frame transmitter.

Although the network has been described with beacon frame transmitters 12, it should be appreciated that instead of beacon signal synchronized transmission other forms of message exchange may be used. In this case beacon frame transmitters 12 act simply as stations. In that case beacon frame requests are only discovery requests and beacon frame transmissions responses to discovery requests.

Furthermore, although an example has been discussed wherein the beacon frame transmitters 12 merely act to relay sensor data, it should be appreciated that the beacon frame transmitters 12 themselves may also be equipped with sensors, so that the beacon frame transmitters 12 can also transmit their own sensor data.

Although a network of sensor stations has been described (each provided with a temperature sensor, and/or a smoke sensor and/or a light intensity sensor and/or a moisture sensor and/or a gas sensor etc.) has been described it should be appreciated that the described techniques can also be applied to non-sensor or part-sensor networks wherein sensor stations 14 are simply information handling stations.

Although an association process with a discovery phase (FIG. 5a) and an association phase has been described, it should be appreciated that the two phases can be integrated partly or wholly. In one embodiment beacon frame requests 50a double as association requests 54a. In another embodiment association grant messages 56a double as beacon transmissions 52a. Both embodiments may be combined. However, the use of separate phases has the advantage that the whole process runs more quickly.

The invention claimed is:

1. A wireless communication network that comprises an association unit and a plurality of stations, each station being configured to start up in a not-associated state and to transmit association request messages in the not-associated state, each station being configured to switch to an associated state upon reception of an association grant in response to one of its association request messages, the association request message and/or the association grant in response thereto establishing an operating route associated with the station for exchanging operating messages with the association unit during subsequent operation, the operating route associated with the station running through a source of the association grant in response to said one of the association request messages and, if the source of the association grant is not the association unit, the operating route between the source of the association grant and the association unit previously established for the source of the association grant in response to association request messages and/or the association grants for intermediate stations, in which network
   the association unit is configured to transmit association grants as responses to received ones of the association request messages;
   at least part of the stations is configured to become active to transmit association grants as responses to received ones of the association request messages, but only after switching to the associated state upon an association grant from the association unit or one of the at least part of the stations switched to the associated state directly or indirectly based on an association grant from the association unit.

2. A wireless communication network according to claim 1, wherein said part of the stations comprises at least one dual function station, said dual function station being configured to transmit association grants only after receiving a secondary association grant, the dual function station being configured to transmit one or more secondary association request messages to the association unit along its operating route when in the associated state, only the association unit being configured to originate the secondary association grant in response to the secondary association request message.

3. A wireless communication network according to claim 2, wherein the dual function station is configured to transmit information to the association unit indicating from which of the stations said dual function station has received transmissions, the association unit being configured to select whether to grant the secondary association request dependent on said information.

4. A wireless communication network according to claim 3, wherein the stations are configured to transmit discovery messages before switching to the associated state, said transmissions comprising at least the discovery messages.

5. A wireless communication network according to claim 2, wherein the dual function station comprises a first and second unit, each with at least a respective antenna, coupled via a mechanically flexible connection, the first unit being configured to transmit first ones of the association request messages and to receive first ones of the association grants, the second unit being configured to receive second ones of the association request messages and to the transmit second ones of the association grants in response to the first ones of the association request messages.

6. A wireless communication network according to claim 2, wherein the dual function station is configured to operate using respective, mutually distinct first and second frequency channels, using the first frequency channel for transmitting association request messages and receiving association grants, and using the second frequency channel for receiving association request messages and transmitting association grants.

7. A wireless communication network according to claim 1, wherein each station from said at least part of the stations is configured to transmit discovery advertisement messages including an identification of the station from said at least part of the stations, the stations that transmit association request messages being configured to address the association request messages using identifications from the discovery advertisement messages.

8. A wireless communication network according to claim 7, wherein each station in said at least part of the stations is configured to indicate, in the discovery advertisement messages, whether the station is enabled to transmit association grants, the stations that transmit association requests being configured to transmit association requests addressed to stations from said at least part of the stations only if the addressed station has indicated in at least one of the discovery advertisement messages that it is enabled to transmit association grants.

9. A wireless communication network according to claim 1, wherein said at least part of the stations are configured to transmit route information toward the association unit after transmitting an association grant, the route information defining the associated route for the station to which the association grant has been sent.

10. A wireless communication network according to claim 9, wherein said at least part of the stations is configured to forward at least part of the route information towards the association unit, to store at least a further part of the route information and to route subsequent messages from the association unit to the station for which the route information was sent according to said stored at least further part.

11. A station for use in a wireless communication network, the station comprising a transmitter arrangement, a receiver arrangement and a processor circuit coupled to the transmitter arrangement and the receiver arrangement, the processor circuit being configured to start up in a not-associated state and to cause the transmitter arrangement to transmit association request messages in the not-associated state, the processor circuit being configured to switch to an associated state upon reception at the receiver arrangement of an association grant in response to one of the association request messages, the processor circuit being configured to establish an associated route for communication with an association unit during subsequent communication of operating messages to an association unit, the associated route including a source of the association grant, and, if the source of the association grant is not the association unit, the operating route between the source of the association grant and the association unit previously established for the source of the association grant in response to association request messages and/or the association grants for intermediate stations, the processor circuit being configured to cause the transmitter arrangement to initiate and transmit association grants in response to association request messages, but only after switching to the associated state.

12. A station according to claim 11, wherein the processor circuit is configured, when switched to the associated state, to cause the transmitter arrangement to transmit a secondary association request message to the association unit, and to cause the transmitter arrangement to transmit the association grants only after receiving a secondary association grant in response to said secondary association request message.

13. A station according to claim 11, wherein the processor circuit is configured to send information to the association unit indicating from which one of the stations said dual function station has received messages prior to receiving the secondary association grant.

14. A method of operating a wireless communication network that comprises an association unit and a plurality of stations, the method comprising
  installing the stations in a not-associated state;
  transmitting association request messages from stations in the not-associated state;
  transmitting the association grants in response to the association request messages,
  switching each station to an associated state when the station has received an association grant in response to one of its association request messages;
  storing route information defining a route between the station that has switched to the associated state and the association unit, the route including the station that has sent the associated grant and, if the source of the association grant is not the association unit, the operating route between the source of the association grant and the association unit previously established for the source of the association grant in response to association request messages and/or the association grants for intermediate stations; wherein
  each association grant is transmitted only from the association unit or from an intermediate station, the latter only after said intermediate station has switched to the associated state upon an association grant from the association unit or one of the at least part of the stations switched to the associated state directly or indirectly based on an association grant from the association unit.

15. A method according to claim 14, wherein the intermediate station is a dual function station, the method comprising
  transmitting a secondary association request message from the dual function station when the dual function is in the associated state;
  transmitting a secondary association grant originating from the association unit in response to the secondary association request message;
  enabling the dual function station to transmit the association grants only upon receiving the secondary association grant.

16. A method according to claim 15, comprising
transmitting information from the intermediate station to the association unit about from which one of the stations the intermediated station has received transmissions;
selecting, in the association unit, whether to grant the secondary association request dependent on said information.

17. A method according to claim 16, further comprising transmitting discovery messages from the stations before switching to the associated state, said transmissions comprising the discovery messages.

18. A method according to claim 15, further comprising the steps of:
transmitting discovery advertisement messages from at least part of the stations, including an identification of the station that has transmitted the discovery advertisement message;
addressing the association request messages using identifications from the discovery advertisement messages.

19. A method according to claim 18, further comprising the steps of:
including an indication in the discovery advertisement messages, whether the station that transmits the discovery advertisement message is enabled to transmit association grants,
transmitting association requests addressed to stations only if the addressed station has indicated that it is enabled to transmit association grants.

20. A method according to claim 15, further comprising switching the intermediate station to operate at a first and second, mutually different transmission frequency after switching to the associated state, for directly or indirectly communicating with the association unit and for communicating with its associated stations respectively.

* * * * *